(12) United States Patent
Onyenemezu et al.

(10) Patent No.: US 11,565,374 B2
(45) Date of Patent: Jan. 31, 2023

(54) FIXED ABRASIVE THREE-DIMENSIONAL LAPPING AND POLISHING PLATE AND METHODS OF MAKING AND USING THE SAME

(71) Applicant: ENGIS CORPORATION, Wheeling, IL (US)

(72) Inventors: Clement N. Onyenemezu, Crest Hill, IL (US); Benjamin R. Rosczyk, Evanston, IL (US); Ion C. Benea, Prospect Heights, IL (US)

(73) Assignee: ENGIS CORPORATION, Wheeling, IL (US)

( * ) Notice: Subject to any disclaimer, the term of this patent is extended or adjusted under 35 U.S.C. 154(b) by 932 days.

(21) Appl. No.: 16/277,827

(22) Filed: Feb. 15, 2019

(65) Prior Publication Data

US 2019/0255676 A1    Aug. 22, 2019

Related U.S. Application Data

(60) Provisional application No. 62/745,249, filed on Oct. 12, 2018, provisional application No. 62/632,808, filed on Feb. 20, 2018.

(51) Int. Cl.
*B24D 3/28* (2006.01)
*B24D 3/34* (2006.01)
(Continued)

(52) U.S. Cl.
CPC ............... *B24D 3/28* (2013.01); *B24B 7/241* (2013.01); *B24B 37/042* (2013.01); *B24D 3/344* (2013.01); *C09K 3/14* (2013.01)

(58) Field of Classification Search
CPC ......... B24B 37/12; B24B 37/14; B24B 37/16; B24D 3/10; B24D 3/18; B24D 3/26
See application file for complete search history.

(56) References Cited

U.S. PATENT DOCUMENTS 6,458,018 B1    10/2002   Goers et al.
6,634,929 B1    10/2003   Visser
(Continued)

FOREIGN PATENT DOCUMENTS

CN    108818298 A  *  11/2018  ............. B24B 37/14
CN    109108844 A  *   1/2019
(Continued)

OTHER PUBLICATIONS

International Preliminary Report on Patentability issued in PCT/US2019/017827 dated Sep. 3, 2020.
(Continued)

*Primary Examiner* — Joel D Crandall
(74) *Attorney, Agent, or Firm* — McDermott Will & Emery LLP

(57) ABSTRACT

A fixed abrasive three-dimensional plate includes micron size diamond beads or a mixture of abrasive particles and metal oxide beads, ranging in size from a few microns to a few tens of microns, incorporated into a matrix of one or more inorganic binders and fillers. The composition is formed into a rigid plate blank, and the abrasive plate is mounted on a substrate forming a lapping/polishing plate. The abrasive plate is capable of delivering high material removal rates coupled with reduced surface roughness when lapping/polishing advanced materials, including sapphire, titanium carbide reinforced alumina, silicon carbide, gallium nitride, aluminum nitride, zinc selenide, and other compound semiconductor materials, as well as, glass, ceramic, metallic, and composite workpieces. The diamond beads incorporated in the fixed abrasive three-dimensional plate include diamond particles ranging in size from a few nanometers to a few tens of microns, bonded with one or more inorganic binders and additives.

26 Claims, 10 Drawing Sheets

(51) Int. Cl.
  *B24B 37/04* (2012.01)
  *B24B 7/24* (2006.01)
  *C09K 3/14* (2006.01)

(56) References Cited

U.S. PATENT DOCUMENTS

| | | | |
|---|---|---|---|
| 6,722,952 | B2 | 4/2004 | Goers et al. |
| 8,038,751 | B2 | 10/2011 | Starling |
| 8,628,383 | B2 | 1/2014 | Starling et al. |
| 8,888,878 | B2 | 11/2014 | Wang et al. |
| 9,149,904 | B1 * | 10/2015 | Moudry .................. B24B 37/12 |
| 2010/0068974 | A1 | 3/2010 | Dumm et al. |
| 2013/0037515 | A1 | 2/2013 | Hosoi et al. |
| 2015/0158141 | A1 | 6/2015 | Aoki et al. |

FOREIGN PATENT DOCUMENTS

| | | | | |
|---|---|---|---|---|
| WO | WO-2013078324 | A1 * | 5/2013 | ............... B24D 3/00 |
| WO | WO-2016017819 | A1 * | 2/2016 | ............. B24B 37/00 |
| WO | 2016/183126 | A1 | 11/2016 | |

OTHER PUBLICATIONS

Lei Guo, Study of Influence of Nanosized Filler on the UV Light-Curable Resin Bonded Arasive Tool. Dissertation Submitted to the Graduate Faculty as Partial Fulfillment of the Requirements for the Doctor of Philosophy Degree in Mechanical Engineering. The University of Toledo (May 2016).

"Engis Flat Lapping/Polishing Systems", Engis Corporation, Mar. 2014 (Mar. 1, 2014), Wheeling, IL, p. 4.

International Search Report and Written Opinion issued in International Application No. PCT/US2019/017827, dated Apr. 24, 2019.

* cited by examiner

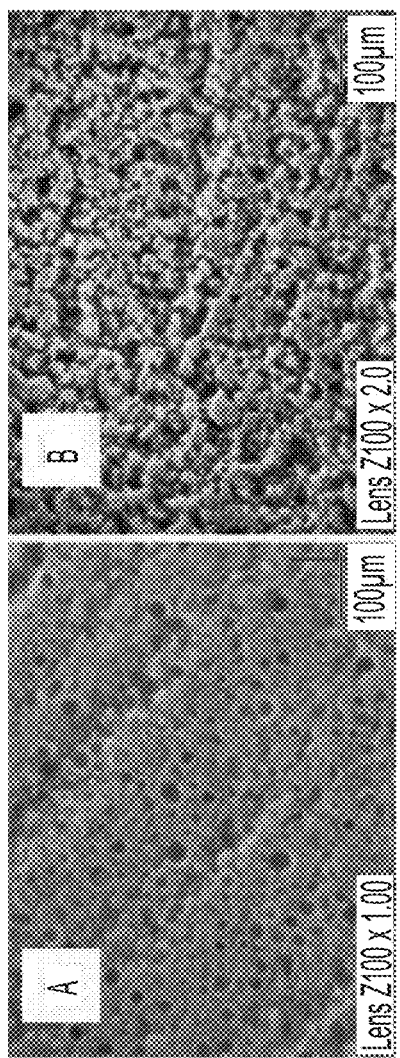
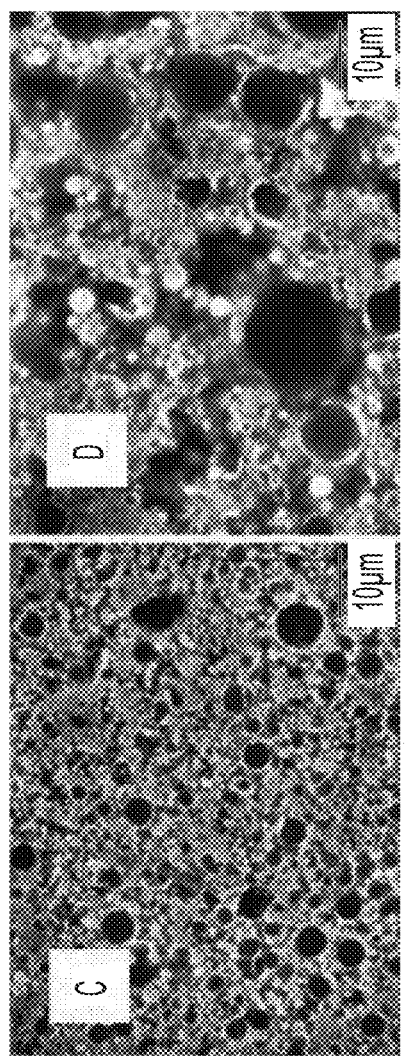
Figure 4A
Figure 4B
Figure 4C
Figure 4D

FIXED ABRASIVE THREE-DIMENSIONAL LAPPING AND POLISHING PLATE AND METHODS OF MAKING AND USING THE SAME

RELATED CASES

The present application claims priority to U.S. Provisional Application No. 62/632,808 filed on Feb. 20, 2018 and U.S. Provisional Application No. 62/745,249 filed on Oct. 12, 2018, the disclosures of each of which are incorporated herein by reference in their entireties.

FIELD OF THE DISCLOSURE

The present disclosure relates to a fixed abrasive three-dimensional plate suitable for use in precision lapping and polishing of advanced materials, such as sapphire, titanium carbide reinforced alumina (AlTiC), silicon carbide (SiC), gallium nitride (GaN), aluminum nitride (AlN), zinc selenide (ZnSe), and other compound semiconductor materials, as well as glass, ceramic, metallic, and composite workpieces. The disclosed fixed abrasive three-dimensional plate, which incorporates diamond beads or a mixture of abrasive particles and metal oxide beads, and fillers, bonded together with the aid of one or more binders and additives, delivers high material removal rates coupled with reduced surface roughness in lapping and polishing of a wide range of workpiece materials.

BACKGROUND

Previously, lapping (rough and fine) and polishing of advanced materials, ceramic, metallic, and composite workpieces was done using a lapping plate in which diamond particles were embedded, in combination with or without loose diamond abrasive slurry.

Industry practice of polishing AlTiC, SiC, GaN, AlN, ZnSe, as well as other similar materials, is by chemical-mechanical planarization (CMP) of the work piece on a pad or rigid plate. In the hard disk drive industry, the steps include rough lap and fine lap/polishing. The rough lap step uses the so-called free/fixed abrasive lapping method. The work piece is brought into contact with a turning plate and a conditioning ring for planarization, while dripping diamond slurry on the plate. The diamond grains embed into the metal turning plate (typically made from zinc, tin or tin-alloy) to form a 2-body system while others roll between the plate and the workpiece in a 3-body system. The use of free and fixed abrasive diamond delivers a higher material removal rate, but high surface roughness. The surface roughness is improved by adding another step of fixed abrasive lapping, where the work piece is brought into contact with a turning plate pre-embedded with diamond grains and lapped with a lubricant vehicle. The lubricant vehicle does not contain aggressive abrasives. The fixed abrasive lapping gives a lower lap rate and better surface finish. While the use of the free and fixed abrasive combination results in improvements in surface finish of the magnetic heads, there are still some disadvantages of handling free diamond slurries with respect to charging efficiency and uniformity. Only about 10% of the diamond in the dripped slurry is embedded into the plate with the rest dripping into the waste collection. Embedded diamond particles are pushed further into the plate as the lapping continues and a few of the diamonds may dislodge and scratch the workpiece. Each round of charged diamond has a limited life before recharging is necessary and very few of the diamond particles are actually charged into the plate.

Alternatively, lapping and polishing may be performed using a diamond abrasive film, consisting of a flexible backing (i.e. PET, Mylar, etc.) coated with a layer of abrasive diamond and binder (i.e. nylon, polyester, epoxy resin, UV curable resin, etc.) which is mounted on a rigid substrate to act as a lapping plate. In U.S. Pat. Nos. 6,458,018; 6,634,929; and 6,722,952 diamond beads were incorporated into abrasive coatings suitable for abrading glass or ceramic work pieces. The abrasive article comprises a structured 3-dimensional coating on a flexible substrate. The structured fixed abrasive coating may be good for rough lapping but not for fine lapping where surface finish is important. The discrete 3-dimensional coating has sharp edges, which contribute to scratching of the work piece. Abrasive pads do not hold good flatness during extended lapping and are known to cause edge rounding of wafers. These abrasive films will need to be replaced frequently due to short run life.

In U.S. Pat. Nos. 8,628,383; 8,888,878; and 8,038,751 diamond beads and aggregates made from abrasive particles and nanoparticle binders were used to form coated abrasive products. The coated abrasive articles produced were tailored for grinding wheels and general-purpose grinding where surface finish is not important. The abrasive aggregates were coated onto a flexible backing to form fixed abrasive pads, which have good stock removal and poor surface finish. When such pads are used to lap wafers, it is hard to maintain good flatness over a long time, and edge rounding will remain a problem.

SUMMARY OF THE DISCLOSURE

To overcome the above-mentioned problems, a fixed abrasive three-dimensional plate is provided, which includes micron size diamond spheres (beads) or a mixture of abrasive particles and metal oxide beads, ranging in size from a few microns to a few tens of microns, incorporated into a matrix consisting of one or more polymeric binders and fillers. The composition is casted in a mold, followed by heat assisted hardening, or room temperature hardening, or hot pressed into a rigid plate blank. The fixed abrasive three-dimensional plate is then mounted on a steel or aluminum substrate to form a lapping/polishing plate. Spherical particles (beads), incorporated in the fixed abrasive plate are composed of abrasive diamond particles ranging in size from a few nanometers to a few tens of microns, bonded together, with the aid of a binder matrix, composed of inorganic binders and additives. In some embodiments, the porosity of the rigid plate provides high lapping/polishing efficiency of the work piece, in the presence of lubricants.

During lapping and polishing operations and in the presence of an appropriate lubricant, diamond particles abrade the workpiece and the lubricant carries the swarf/debris away from the plate through the pores, thereby reducing scratching of the workpiece. The diamond particles are constantly exposed because the wear rate of the binder matrix is faster than that of the diamond. The wear rate of the binder matrix depends on the hardness of the diamond shell and the filler type.

In an embodiment of the disclosure, a fixed abrasive three-dimensional rigid plate suitable for use in precision lapping and polishing of advanced materials is composed of a composition including: a) a plurality of micron-sized composite spherical abrasive beads, b) at least one polymeric resin bonding the spherical abrasive beads, c) 1 wt. % to 40 wt. % on a dry weight basis of the rigid plate of at least one porosity additive, and d) 1 wt. % to 40 wt. % on a dry weight basis of the rigid plate of one or more inorganic fillers. The fixed abrasive three-dimensional rigid plate has a surface area porosity of 5% to 60%, and a plurality of the pores in the rigid plate is neither uniform nor regular and are not intra-connected throughout a thickness of the three-dimensional abrasive plate. In an embodiment, the abrasive beads are formed from spray drying a sprayable slurry of abrasive particles, inorganic metal oxide binder, and dispersants. In an embodiment, the abrasive particles are chosen from natural diamond, synthetic diamond, cubic boron nitride, silicon carbide, and combinations thereof. In an embodiment, the abrasive particles are natural or synthetic diamond. In an embodiment, the inorganic metal oxide binder is chosen from silicon dioxide, titanium dioxide, cerium oxide, zirconium oxide, aluminum oxide, and mixtures thereof. In an embodiment, the abrasive beads have an average particle size of 5 microns to 50 microns. In an embodiment, the abrasive particles contained in the abrasive beads have an average size of 0.01 microns to 10 microns. In an embodiment, the abrasive beads comprise 30% to 95% of the composition of the rigid plate by weight, and the diamond particles comprise from 20% to 50% by weight of the abrasive beads on a dry basis. In an embodiment, the polymeric resin is chosen from the group consisting of base-catalyzed phenolic resin, acid-catalyzed phenolic resin, epoxy resins, unsaturated polyester resins, and mixtures thereof. In an embodiment, the polymeric resin is a base-catalyzed phenolic resin. In an embodiment, the composition of the rigid plate comprises from about 5 wt. % to about 35 wt. % of the polymeric resin. In an embodiment, the porosity additive are hollow glass spheres having an average diameter of 10 microns to 200 microns. In an embodiment, the filler is selected from the group consisting of calcium carbonate, calcium metasilicate, talc, kaolin, calcium oxide, and mixtures thereof. In an embodiment, the filler is calcium carbonate.

In another embodiment of the disclosure, a fixed abrasive three-dimensional rigid plate suitable for use in precision lapping and polishing of advanced materials is composed of a composition including: a) a plurality of micron-sized inorganic metal oxide spherical beads, b) super abrasive particles, c) at least one polymeric resin bonding the spherical metal oxide beads and super abrasive particles together, d) 1 wt. % to 40 wt. % of at least one porosity additive based on a weight of the composition, and e) 1 wt. % to 40 wt. % of one or more inorganic fillers based on a dry weight basis of the composition. The fixed abrasive three-dimensional rigid plate has a surface area porosity of 5% to 60%, and a plurality of the pores in the rigid plate is neither uniform nor regular and are not intra-connected throughout a thickness of the three-dimensional abrasive plate. In an embodiment, the inorganic metal oxide spherical beads are formed from spray drying a metal oxide binder and dispersants. In an embodiment, the inorganic metal oxide binder is chosen from silicon dioxide, titanium dioxide, cerium oxide, aluminum oxide, and mixtures thereof. In an embodiment, the super abrasive particles are chosen from natural diamond, synthetic diamond, cubic boron nitride, and silicon carbide.

In another embodiment of the disclosure, a method of forming a fixed abrasive three-dimensional rigid plate suitable for use in precision lapping and polishing of advanced materials is provided. The fixed abrasive three-dimensional rigid plate is composed of a composition including: a) a plurality of micron-sized composite abrasive spherical beads or a mixture of micron-sized metal oxide beads and super abrasive particles, b) at least one polymeric resin bonding the spherical beads or metal oxide beads together, c) 1 wt. % to 40 wt. % based on a weight of the composition of at least one porosity additive, and d) 1 wt. % to 40 wt. % on a dry weight basis of the composition of one or more inorganic fillers. The three-dimensional fixed abrasive rigid plate is formed to provide a three-dimensional rigid plate with a controlled surface area porosity of 5 to 60% by steps of: hot pressing the composition, bonding the hot pressed composition to a base plate, and grinding the bonded hot pressed composition to a flatness. The three-dimensional fixed abrasive rigid plate is capable of lapping an AlTiC workpiece to reduce the surface roughness Ra from 30 nm to 3 nm or less in less than 15 minutes, and the three-dimensional fixed abrasive bead plate is capable of polishing a SiC workpiece to a surface roughness Ra of 0.4 nm or less in 60 minutes. In an embodiment, the method includes forming the fixed abrasive three-dimensional rigid plate in a mold by heat assisted hardening, room temperature hardening, or hot press molding. In an embodiment, the hot pressing includes forming the fixed abrasive three-dimensional rigid plate in a mold at a molding temperature from 240° F. to 380° F. In an embodiment, the hot pressing is at a pressure of 500 psi to 2,000 psi. In an embodiment, the hot pressing is at a pressure of 800 psi to 1,200 psi. In an embodiment, the hot pressing is at a pressure of 800 psi to 1,200 psi, and the plate has a thickness of 0.1 inch to 1.0 inch. In an embodiment, the hot pressing is at a pressure of 800 psi to 1,200 psi, and the plate has a diameter of 1 inch to 60 inches. In an embodiment, the fixed abrasive three-dimensional rigid plate includes a plurality of pores. In an embodiment, the pores are non-uniform, non-regular and are not intra-connected throughout the thickness of said abrasive three-dimensional rigid plate.

BRIEF DESCRIPTION OF THE DRAWINGS

FIG. 4A is an optical micrograph showing the surface porosity of the Example 3 plate having 7% porosity. FIG. 4B is an optical micrograph showing the surface porosity of the Example 4 plate having 40% porosity. FIG. 4C is an optical micrograph showing the surface porosity of the Example 5 plate having 44% porosity. FIG. 4D is an optical micrograph at a higher magnification of the Example 5 plate.

DETAILED DESCRIPTION OF THE DISCLOSURE

Figure 1:
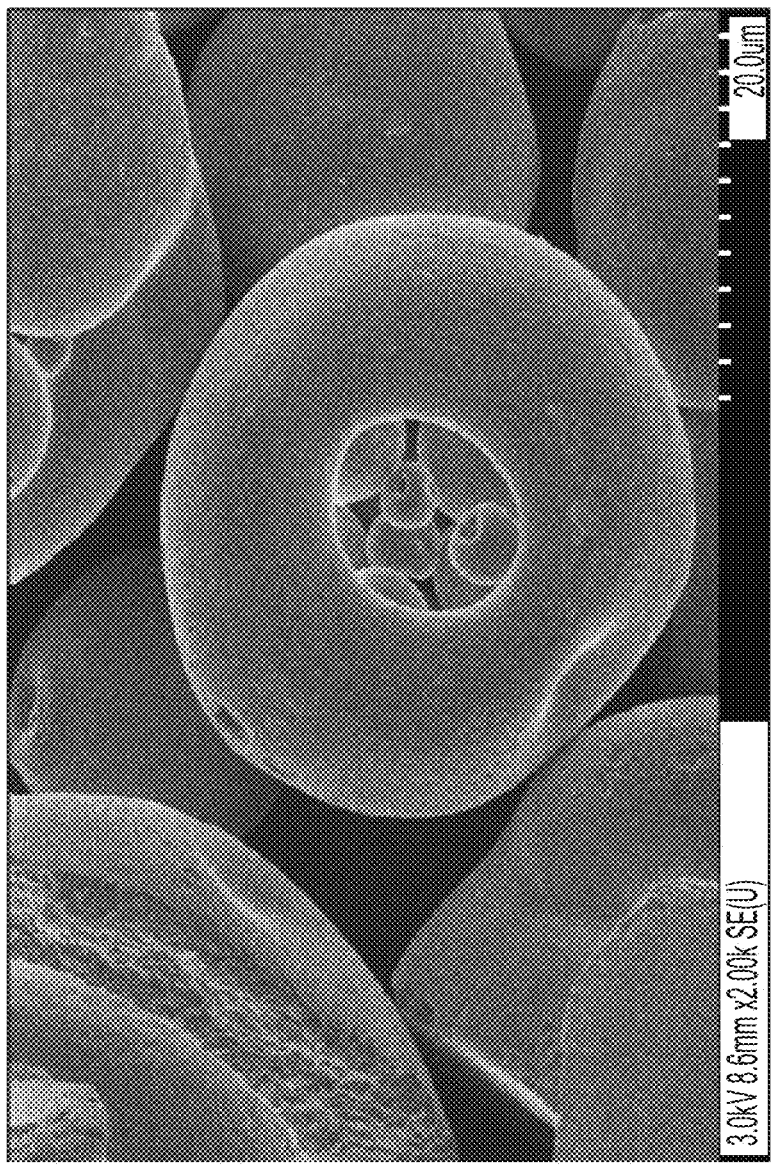
FIG. 1 shows spray dried abrasive beads incorporating monocrystalline diamond according to an embodiment of the disclosure.

Abrasive beads, for example diamond abrasive beads, are formed by a spray drying process. A slurry of abrasive particles is made by dispersing abrasive grains in a liquid carrier in the presence of inorganic binder, dispersing agent and/or plasticizer. The constituents are mixed thoroughly with a propeller mixer or ultrasonic mixer or other appropriate dispersing mechanisms to give a uniformly dispersed abrasive slurry. The slurry is then spray dried to form spherical abrasive beads (FIG. 1). Suitable abrasive grains for embodiments of the present disclosure generally have Mohs hardness of greater than 5. Examples of abrasive grains includes carbides, for example, silicon carbide and titanium carbide; oxides, for examples, alumina, zirconium oxide, silicon oxide, etc.; nitrides, for example, cubic boron nitride, titanium nitride, silicon nitride, etc.; and monocrystalline, polycrystalline, and surface etched synthetic diamond, as well as natural diamond. Diamond is selected as an abrasive grain in some embodiments because of its hardness and chemical inertness.

In some embodiments, the abrasive beads are a composite of a mixture of abrasives or a composite of an abrasive and a metal oxide, such as an inorganic metal oxide. In some embodiments, the abrasive beads are spherical. In some embodiments, micron-sized abrasive spherical beads have an average particle size of 5 microns to 50 microns. In some embodiments, the abrasive particles contained in the abrasive beads have an average size of 0.01 microns to 10 microns.

The abrasive grains come in different sizes from nano sizes to micron sizes and shapes from 3-D blocky shapes to 2-D shapes, and surface roughnesses ranging from smooth to rough. The abrasive grains may be coated with organic, inorganic, or metallic coatings. The size range of the abrasive grains may be from about 5 nm to about 12 microns in some embodiments, from about 50 nm to about 7 microns in other embodiments, and less than about 4 microns in yet other embodiments. The abrasive grain composition of the slurry for spray drying is between about 1 wt. % and about 50 wt. % in some embodiments, and between about 5 wt. % and about 35 wt. % in other embodiments, based on the weight of the slurry for spray drying. In some embodiments of the disclosure, mixtures of two or more particle sizes are used for desired lapping/polishing results.

In some embodiments, the abrasive particles are super abrasive particles. The super abrasive particles include: natural diamond, synthetic diamond and cubic boron nitride.

Figure 2:
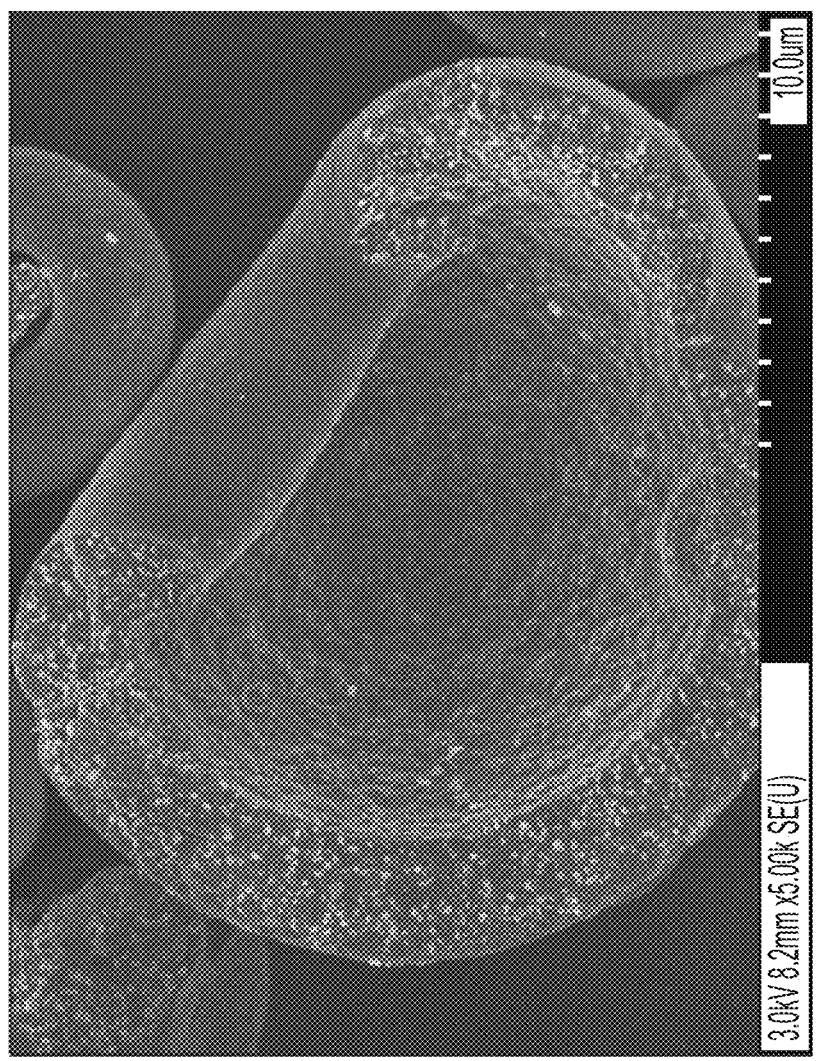
FIG. 2 shows a cross section of diamond abrasive bead showing the hollow shell structure of diamond abrasive bead with 0.25 μm diamond particles uniformly distributed in the silica binder matrix according to an embodiment of the disclosure.

The abrasive grains are subsequently mixed with inorganic metal oxide binder to form sprayable slurries/sols in some embodiments. The metal oxide binder forms a friable continuous matrix holding the plurality of the abrasive grain particles together as shown in FIG. 2. Suitable metal oxide binders include ceria, silica, zirconia, alumina, titanium dioxide, magnesium oxide, and mixtures thereof. In many embodiments, silica is used as the metal oxide binder. Silica is available as colloidal silica from many commercial manufactures. Some suitable commercially available colloidal silica are: NexSil 5, NexSil 6, NexSil 8, NexSil 12, NexSil 20, NexSil 20A, NexSil 20K-30, NexSil 20NH4, Nyacol DP9711 (from Nyacol Nano Technologies, Inc. Ashland, Mass.), Bendzil 2040, Levasil 2050, Levasil FO1440, Megasol S50, (Wesbond Corporation, Wilmington, Del.), Nalco 1050, Nalco 1060, Nalco 1130, Nalco 2326, Nalco 2360 (Nalco, Naperville, Ill.) Ludox SM30, Ludox HS30, Ludox AM30, Ludox PX30, Remasol SP30, Remasol LP40 and Remasol LP40 (from Remet Corporation, Utica, N.Y.). Different sizes of colloidal silica could be used from about 5 nm to about 200 nm in some embodiments, from about 5 nm to about 100 nm in other embodiments, and from about 5 nm to about 60 nm in yet other embodiments. The sprayable abrasive grain and metal oxide binder slurry has a solid content of about 5 wt. % to about 60 wt. % in some embodiments and about 10 wt. % to about 50 wt. % in other embodiments, based on the weight of the slurry. The metal oxide binder content of the sprayable abrasive mixture is between about 1 wt. % and about 90 wt. %, in some embodiments and between about 10 wt. % and about 80 wt. % in other embodiments on a basis of the dry components.

In some embodiments, the sprayable abrasive slurry mixture composition includes a dispersant and or humectant. Dispersants aid in dispersing and stabilizing the abrasive particles in the slurry. They are organic, inorganic or polymeric agents capable of suspending the particles in the sprayable slurry. Suitable dispersants include polyvinyl alcohol, polyvinyl butyral, polyvinyl pyrrolidinone of low to medium molecular weight, cellulose, and cellulose derivatives; for example carboxymethyl cellulose, hydroxyethyl cellulose, and sodium alginate. Other examples include sucrose, maltose, lactose, low to medium molecular weight polyethylene glycol and any combination thereof. To reduce quick drying of the slurry inside the nozzles, humectants may be added to the sprayable slurry. Humectants are low evaporating solvents or soluble organic or inorganic salts capable of retaining water. Exemplary humectants are glycerin, polyols, and polyethylene glycols. In some embodiments, sucrose is the dispersant.

The dispersed sprayable diamond slurry is nebulized into droplets in a spray dryer and dried to fine powder at a temperature of about 170° C. The dried particles formed are collected at the cyclones. Large particles and aggregates collected at the bottom of the main drying chamber of the dryer are rejected. The inorganic metal oxide binder forms identifiable spherical particles embedded with diamond particles as shown in FIG. 2. While the formed beads are identifiable particles, the metal oxide binders and the diamond grains are not fused/sintered at the spraying temperature and can be broken under certain shear conditions. Spray dried diamond beads in some embodiments of the disclosure exhibit a wide particle size distribution with a mean diameter between about 12 microns to about 25 microns. The average diamond bead size can be manipulated by changing the spray drying process parameters and/or the composition of the sprayable slurry. Common classification or grading techniques are used to separate the beads into desired narrow mean sizes and, respectively, narrow particle size distributions.

In another embodiment, the inorganic metal binders, silica, ceria, titanium dioxide and alumina or mixtures thereof, were spray dried without abrasive particles in the presence of dispersants and humectants to form metal oxide beads, such as silica beads. Silica beads were used in conjunction with diamond abrasive to form 3-dimensional fixed abrasive plates for lapping/polishing silicon carbide wafers in some embodiments.

In some embodiments, the inorganic metal oxide beads are micron-sized inorganic metal oxide beads having an average particle size of 5 microns to 50 microns. In some embodiments, the inorganic metal oxide beads are spherical.

Figure 3:
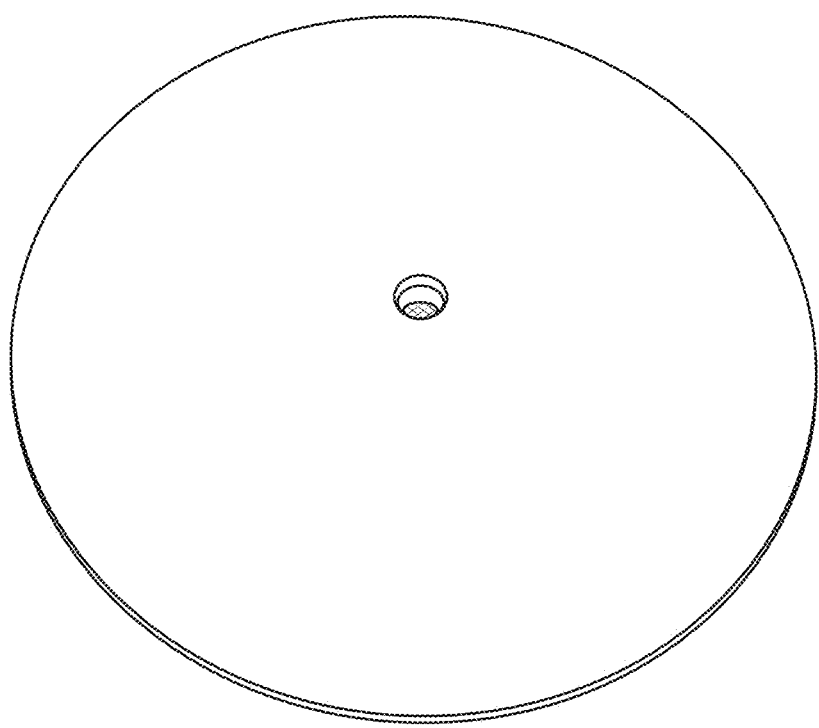
FIG. 3 shows a 14" fixed abrasive bead lapping/polishing plate made in one piece according to an embodiment of the disclosure.

Graded diamond beads are then used in different formulations to make 3-dimensional fixed abrasive bead lapping/polishing plates as shown in FIG. 3. The 3-dimensional fixed abrasive plate can be made in one piece as in FIG. 3, or segments to form larger plates. In addition to the diamond beads, the 3-dimensional fixed abrasive plate of the present disclosure may contain polymeric resin, fillers and porosity additives. Polymeric resins suitable for embodiments of the disclosure include Araldite MT35700 benzoxazine resin from Huntsman (Woodland, Tex.), epoxy resins, bisphenol A modified epoxy resins, epoxy Novolac resins, and their curing agents. Examples of commercially available epoxy resins are Dow Chemical's (Midland, Mich.) D.E.R 330, D.E.R 335, D.E.R 671, D.E.R 640, DEH 84, and DEH 85; Huntsman's (Woodland, Tex.) Araldite PY 282, 304 and GY 280, 253, 505, 502, and EPN 1179; and Hexion's (Columbus, Ohio) Epon resin phenolic epoxy resin series, Epon 825, 828, 862, and 813. Other suitable polymeric resins are unsaturated polyester resin, urea formaldehyde resin, melamine formaldehyde resin, base-catalyzed phenolic resin, and acid-catalyzed phenolic resin. Examples of commercially available phenolic resins are: Bakelite PF02245P, Durite Resin AD3237, and Durite Resin AD5534, from Hexion in Columbus, Ohio; Plenco 14043 from Plastics Engineering Company, Sheboygan, Wis.; Varcum 29310, 28108, 29318, 29334, 28317, 28101, 29008, 29108, and 29319 from SBHPP, Novi, Mich. In some embodiments, suitable polymeric resins include powdered phenolic resins and their derivatives. Using powdered phenolic resin allows for incorporation of higher volume percentage of diamond beads and fillers. Phenolic resins also provide higher temperature resistance and plate hardness necessary for high stock removal during lapping. The composition of the phenolic resin in the 3-dimensional fixed abrasive formulation is from about 5 wt. % to about 60 wt. % in some embodiments, and from about 5 wt. % to about 35 wt. % in other embodiments based on the weight of the abrasive plate.

In another embodiment, the 3-dimensional fixed abrasive plate contains filler materials. Fillers are cheap non-functional materials used to reduce cost without any negative impact on the performance of the lapping plate. Fillers help to increase the wear rate of the polymer binders, thereby constantly exposing new diamond beads. Fillers prevent the diamond from dulling, thereby maintaining constant cutting action for the life of the lapping plate. Some suitable fillers are ground and precipitated calcium carbonate, talc, kaolin, hydrated aluminum silicate, calcium metasilicate, alumina, and clay or combinations thereof. Ground calcium carbonate is the filler in some embodiments. Examples of commercially available calcium carbonate from Specialty Minerals of Adams, Mass., are Albacar 5970, Albaglos PCC, Albacar 8101, and Vicron GCC. The particle size of the calcium carbonate is between about 1 micron and about 30 microns and the composition of the filler is from about 1 wt. % to about 40 wt. % in some embodiments and between about 5 wt. % and about 30 wt. % in other embodiments.

For efficient removal of the swarf and maintenance of constant cutting rate, the 3-dimensional fixed abrasive plate is designed with plurality of pores in the plate. Pores on the surface of the plate, as shown in FIGS. 4A-4D, form discontinuous lapping lands and provide channels for lapping lubricant to flow and prevent hydroplaning of the workpiece. The resultant debris/swarf is washed into the pores to avoid scratching of the workpiece. Embodiments of the disclosure control the surface porosity of the plate.

Hollow glass spheres were added in the formulation of the 3-dimensional fixed abrasive plate to increase and control porosity of the plate. Some examples of commercially available hollow glass spheres applicable to embodiments of the disclosure are: 3M Glass bubble series S32, S15, S22, K37, K20, 38HS, and K1 from 3M Advanced Materials, St. Paul, Minn.; Extendosphere series TG, SGT, SLG, CG, SG, and TG from Sphere One, Chattanooga, Tenn.; Sphericel series of hollow glass spheres from Potters Industries LLC, Valley Forge, Pa. The amount of hollow glass spheres in the formulation is between about 1 and about 50 wt. % in some embodiments, between about 1 and 40 wt. %, and between about 5 and about 30 wt. % in other embodiments. Particle size distribution of the hollow glass spheres is the range of about 1 to about 500 microns in some embodiments. Extendosphere SG hollow glass spheres are used in some embodiments of the disclosure.

Figure 5:
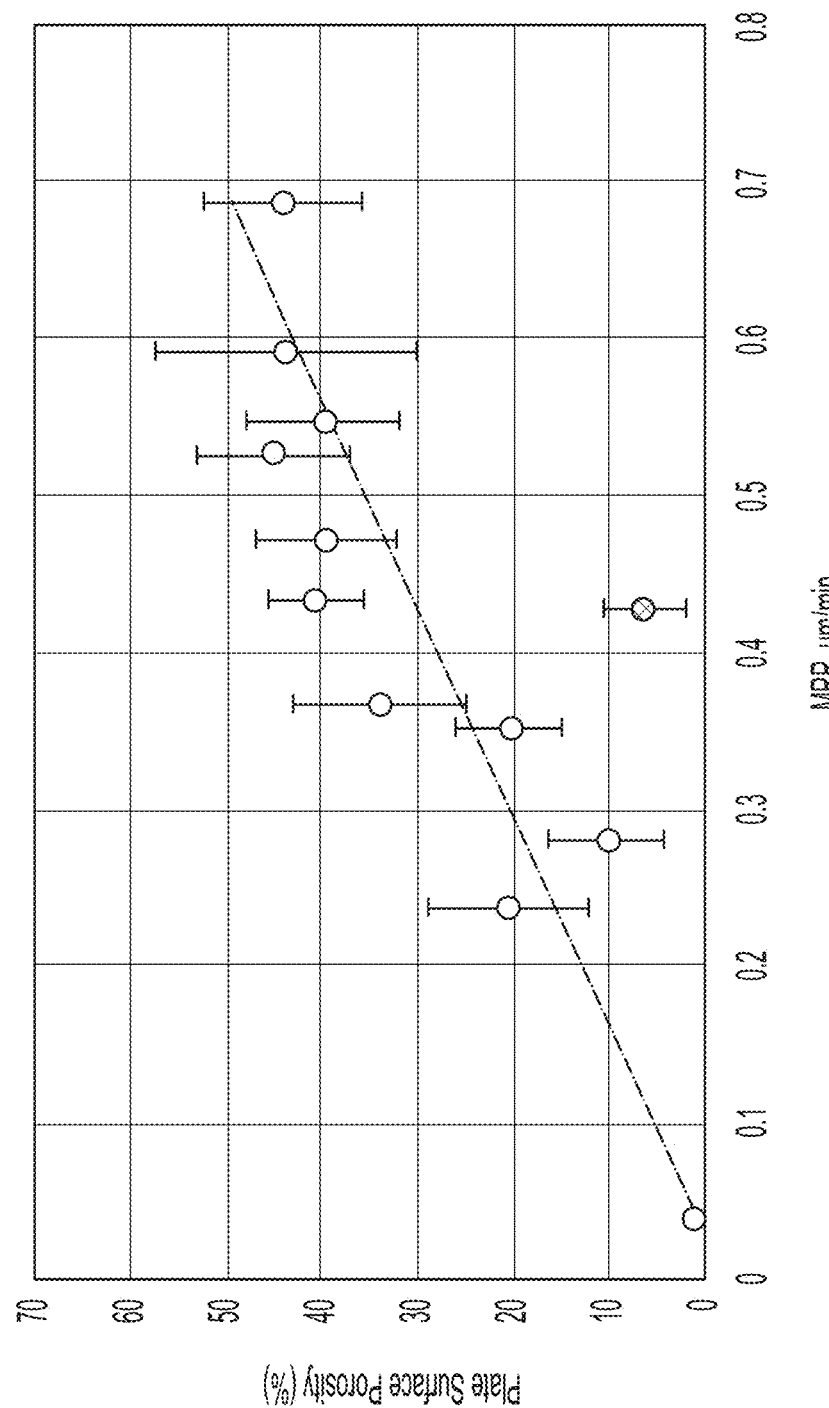
FIG. 5 shows the effect of fixed abrasive bead plate surface porosity on the material removal rate of AlTiC material according to an embodiment of the disclosure.

The wide particle size distribution of the hollow glass spheres gives the 3-dimensional fixed abrasive bead plate a mixture of pore sizes. There are also pores caused by packing structure of the spherical diamond beads. The interstices of the packing structure are partially filled with resin to bond them together. The diamond beads themselves are porous (FIGS. 1 and 2). There are holes in majority of the beads, and the solid mass of the beads is porous since the silica binder is not sintered. That is why the beads are friable and easy to abrade to expose the diamond. There are also pores due to entrapped air during mixing and/or curing. The extent of entrapped air is controlled by molding pressure. Excessive molding pressure will squeeze out entrapped air and decrease the interstices and overall porosity of the plate. Stock removal rate efficiency of the workpiece depends on total porosity of the plate as demonstrated in FIG. 5. 3-dimensional fixed abrasive diamond bead plates with little to no porosity do not give a good stock removal action. FIG. 5 shows effect of surface porosity on the material removal rate (MRR) when lapping AlTiC material. As shown in FIG. 5, at surface porosities of about 40% or greater, the material removal rate (MRR) is about 0.4 µm/min or higher.

Surface porosity may be analyzed by different techniques. Optical interferometry and stylus profilometry may be used to measure the surface profile (roughness) and calculate the surface porosity. Bulk porosity measurement methods, such as x-ray computed tomography, may also be used to calculate the surface porosity. Gas adsorption or liquid intrusion porosimetry is not adequate due to the closed nature of some pores. 3-D optical image analysis was used to quantify surface porosity in embodiments of this disclosure. 3-dimensional fixed abrasive bead plate surface porosity was measured by optical image analysis of high resolution 3D images of the plate. The percent surface area with pores are mapped and calculated to give the percent porosity of the plate surface, or surface area porosity, at a given magnification. The percent surface area porosity is a measure of the areas with pores compared to the total area of the plate. The minimum surface area porosity of the plate for a good cut rate is about 3% in some embodiments, in some embodiments the porosity is greater than 10%. Above 60% porosity, the integrity of the plate suffers, and the cut rate drops off fast and surface finish may be compromised.

While phenolic resin is used in some embodiments, other common binders, such as unsaturated polyester, epoxy, acrylic polyol, etc., are used in other embodiments. Similar porosity can be achieved with foam binders like polyurethane binders, which form a porous network structure.

Due to its flexibility of incorporating diamond beads made of diamond or other abrasive particles ranging in size from a few nanometers to a few tens of microns, the fixed abrasive three-dimensional plate according to this disclosure can be used in other fine grinding, lapping and polishing applications.

Some embodiments will not work properly if the diamond beads are sintered so the inorganic metal oxide binder is hard to abrade or there is a significant reduction in porosity. Also, if the diamond beads are so porous that they are easy to compress under pressure the surface porosity will be reduced. Excessive porosity will lead to a frail plate with a high wear rate and a very low life cycle. For best performance, the plate surface porosity should be between about 5% and about 60% of the surface area. The diamond beads and plate should be able to withstand aqueous treatment without changing porosity.

EXAMPLES

Example 1

Preparation of Diamond Beads:

851.9 grams of Remasol SP30 colloidal silica slurry (commercially available from Remet Corporation, Utica, N.Y.) was mixed with 8.1 grams of sucrose and 140 grams of 1.25 μm monocrystalline diamond in a 2-liter glass beaker with a propeller mixer for 20 minutes. Then the slurry was dispersed further for 20 minutes with an ultrasonic disperser. The resultant slurry was spray dried using a Yamato ADL311 spray dryer (Yamato Scientific America Inc., Santa Clara, Calif.) equipped with a #4 nozzle assembly having 1530 μm orifice. The slurry was under constant agitation before feeding into the inlet tube and flows into the spray chamber at inlet temperature of 170° C. The spray drying process entails feeding the slurry into the nozzle chamber with a peristaltic pump. The slurry is atomized as it passes through the orifice by pressurized air into the drying chamber at an inlet temperature of 170° C. Water is stripped from the slurry droplets to form discrete particles containing diamond in a silica matrix and sucrose. The discrete powder particles are separated by the cyclone into the collection jar while steam is exhausted. Oversized particles and aggregates collected at the bottom of the drying chamber are discarded as waste. The outlet temperature is about 96° C. The diamond slurry according to this recipe provided a yield of 85% diamond beads. Analysis of the beads by scanning electron microscopy (SEM) shows spherical particles with distinct features of porosity. The beads have a mean particle size of 19 μm as measured with Multisizer 3 Coulter Counter from Beckman Coulter Inc. Collected diamond beads were subsequently graded to a mean particle size of 23 μm.

Example 2

Preparation of Diamond Bead Lapping Plate:

In a mixing container 200 grams of graded diamond beads from Example 1, composed of 1.25 μm diamond particles in silica matrix was mixed with 245 grams of Araldite GY502 liquid bisphenol, an epoxy resin from Huntsman Advanced materials, Woodland, Tex. and 55 grams of Aradur 956-2 epoxy curing agent from Huntsman Advanced materials, Woodland, Tex. The components were mixed in a rotary mixer for about 30 minutes, mixed and cast onto an 8-inch round mold and left overnight to cure at room temperature to form a 3-dimensional fixed abrasive plate/blank. The cured plate was mounted on a rigid 8-inch base plate with an epoxy adhesive and planarized using a rotary silicon carbide grinder to make the 3-dimensional fixed abrasive plate suitable for lapping advanced materials.

Figure 6:
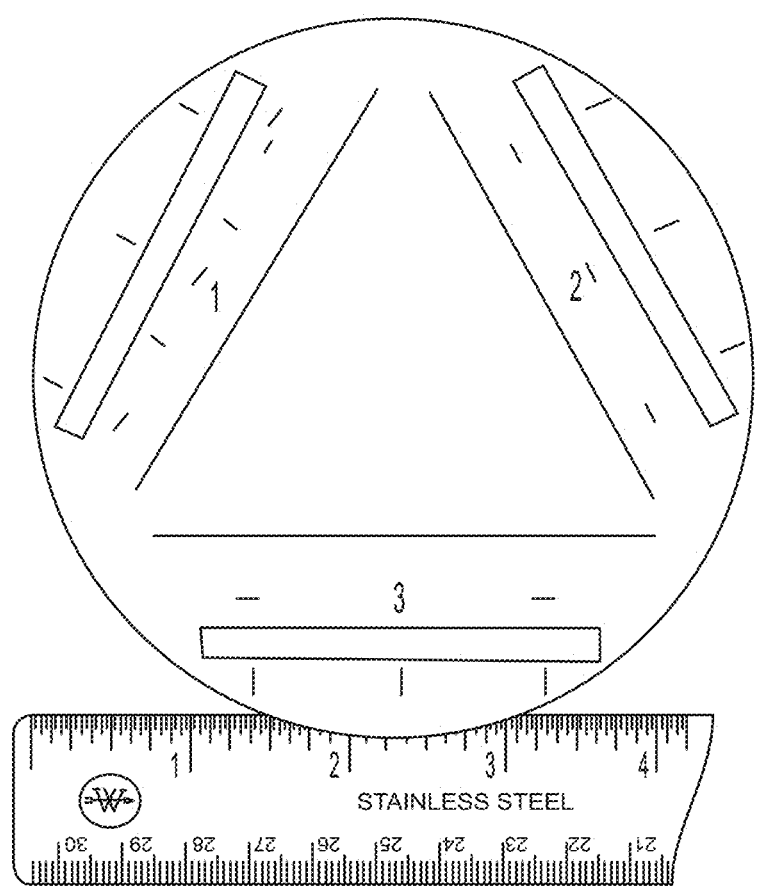
FIG. 6 illustrates a work piece including AlTiC dummy bars according to an embodiment of the disclosure.

Lapping/Polishing Tests:

The planarized diamond bead plate was subjected to performance testing on a modified 15-inch Engis Corporation Fast Lap machine, FL-15. An 8-inch diamond bead plate was mounted atop of a 15-inch platen in the center and held in place in three places with studs. The workpiece consists of 3-pieces of AlTiC dummy bars (57.8 mm×2.5 mm) bonded to a 4-inch diameter ceramic block in a triangular pattern (FIG. 6). The workpiece was brought into contact with the diamond bead plate at a pressure of 24.8 psi. The diamond bead plate rotates counterclockwise at 30 rpm, while the workpiece, which is off center from the plate by 2 inches, rotates counterclockwise also at about 30 rpm. Lapping of the workpiece was done in six successive runs of 15 minutes each, at a constant flow rate of 2.4 ml/min of L6037 lubricant (glycol lubricant from Engis Corporation, Wheeling, Ill.). After each run, the difference in thickness of each AlTiC workpiece was measured with a Fowler Sylvac Ultra-Digit Mark IV drop indicator with accuracy ±2 μm in order to determine the average material removal rate (MRR) over 6 runs. Surface roughness was measured using Zygo NewView 6K Optical Profilometer. The material removal rate (MRR) for this plate is 0.28 μm/min.

Examples 3-6

Graded diamond beads of about 23 μm mean diameter from Example 1, were mixed with Varcum 29317 phenolic resin (from SBHPP, Novi, Mich.), Vicron 45-3 ground calcium carbonate from Specialty Minerals Inc., Adams, Mass., and Extendosphere SG, hollow glass sphere from Sphere One, Chattanooga, Tenn. according to the component ratios shown in Table 1.

TABLE 1

| Material Description | Example 3 (wt. %) | Example 4 (wt. %) | Example 5 (wt. %) | Example 6 (wt. %) |
| --- | --- | --- | --- | --- |
| Extendospheres SG 160 μm | | | 10 | |
| Vicron 45-3 calcium carbonate | | | 20 | |
| 1.25 μm diamond beads in silica | 95 | 80 | 50 | 50 |
| Varcum 29317 phenolic resin | 5 | 20 | 20 | 50 |

The powder components were thoroughly mixed in a rotary mixer and poured into an 8-inch round hot press mold. The powder mix was leveled, and the flange replaced to make a tight fit. The mold and content were put onto a preheated 30-ton Wabash 15"×15" molding hot press (Wabash MPI, Wabash, Ind.). The mold was heated to 300° F. and hot pressed at pressure of about 900 psi for 10 minutes to form a rigid 3-dimensional fixed abrasive lap plate blank. The rigid blank plate was mounted on an 8-inch steel base plate with the aid of epoxy adhesive and subsequently planarized to a flat surface for performance testing.

The planarized 3-dimensional fixed abrasive bead plate was subjected to performance testing on a modified 15-inch Engis Corporation Fast Lap machine. The 8-inch diamond bead plate was mounted atop of 15-inch platen in the center and held in place in three places with studs. The work piece is 3-pieces of AlTiC dummy bars (57.8 mm×2.5 mm) bonded to a 4-inch diameter ceramic block in a triangular pattern (FIG. 6). The workpiece was brought into contact with the diamond bead plate at a pressure of 24.8 psi. The platen together with the diamond bead plate rotates counterclockwise at 30 rpm, while the workpiece which is off center from the plate by 2 inches rotates counterclockwise also at about 20 rpm. Lapping of the workpiece was done in six successive runs of 15 minutes each at a constant flow rate of 2.4 ml/min of L6037 lubricant (glycol lubricant from Engis Corporation, Wheeling, Ill.).

After each run, the difference in thickness of each AlTiC workpiece was measured with a Fowler Sylvac Ultra-Digit Mark IV drop indicator with an accuracy ±2 μm in order to determine the average material removal rate (MRR) over 6 runs. The average surface roughness (Ra) of the lapped work piece was measured with Zygo NewView 6K Optical Profilometer. The results are shown in Table 2.

TABLE 2

Results of Lapping of AlTiC workpiece with diamond bead plates

| Abrasive Plates* | Surface Porosity (%) | Material Removal Rate, MRR (μm/min) | Average Surface Roughness, Ra (nm) |
|---|---|---|---|
| Example 2 | 10 | 0.28 | 2.5 |
| Example 3 | 7 | 0.42 | 2.6 |
| Example 4 | 40 | 0.47 | 2.6 |
| Example 5 | 44 | 0.67 | 2.5 |
| Example 6 | 1 | 0.04 | 2.5 |
| Example 7 | 34 | 0.37 | 2.7 |
| Example 8 | 40 | 0.55 | 2.5 |

*3-dimensional fixed abrasive plate made with 23 μm diamond beads containing 1.25 μm monocrystalline diamond in silica binder.

Surface Porosity Measurement

Porosity of the plates were measured using a Keyence optical microscope.

Figures 7A, 7B:
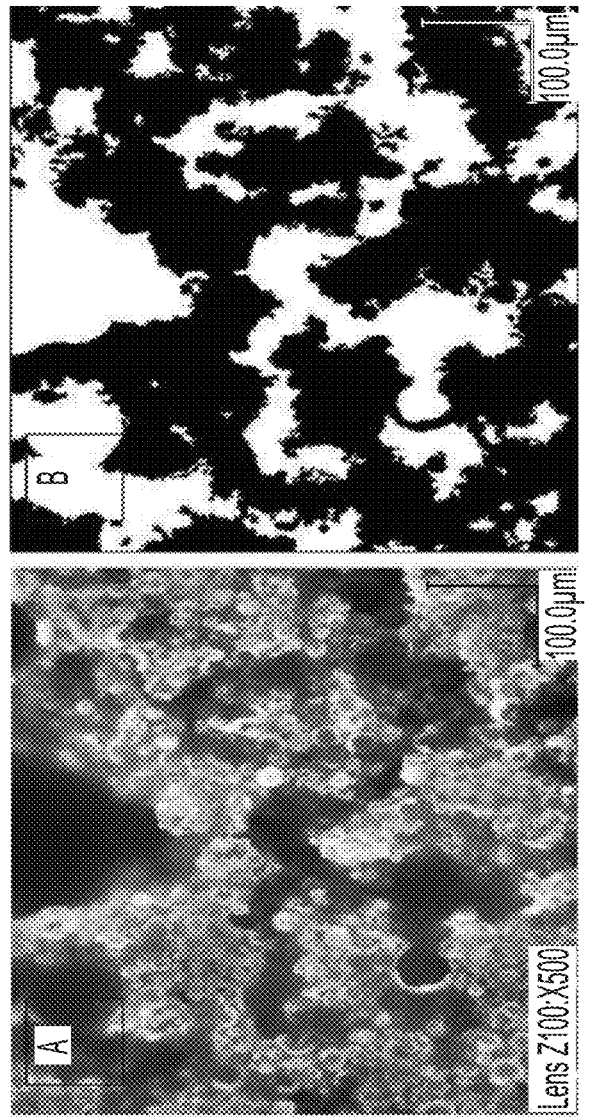
FIG. 7A is 500× optical image illustrating a color thresholding of the plate after lapping according to an embodiment of the disclosure.
FIG. 7B is the same image as 7B after color thresholding.

After lapping, the plate porosity was measured by color thresholding at 500× magnification on a Keyence VHX5000 microscope with a light polarizer (see FIG. 7A). The plate porosity was calculated from the average of ten (10) measurements from 10 images. The percentage of the white area of FIG. 7B is calculated as the percent porosity.

FIG. 3A is an optical micrograph showing the surface porosity of the Example 3 plate having 7% porosity. FIG. 3B is an optical micrograph showing the surface porosity of the Example 4 plate having 40% porosity. FIG. 3C is an optical micrograph showing the surface porosity of the Example 5 plate having 44% porosity. FIG. 3D is an optical micrograph at a higher magnification of the Example 5 plate.

Measured porosity of examples 4 and 5 was high at 40% and 44% respectively and showed a corresponding higher material removal rate, while example 6 with only 1% porosity gave an insignificant lap rate.

Example 7

250 grams of graded diamond beads of about 23 μm mean diameter from Example 1, were mixed with 100 grams of Varcum 29317, phenolic resin (from SBHPP, Novi, Mich.), and 150 grams of Vicron 45-3 ground calcium carbonate from Specialty Minerals Inc., Adams, Mass., to form a diamond powder mixture. The mixed powder was sieved into an 8-inch square hot press mold. The powder mix was leveled, and the flange replaced to make a tight fit. The mold and content were put onto a preheated 30 ton Wabash 15"×15" molding hot press (Wabash MPI, Wabash, Ind.). The mold was heated to 300° F. and hot pressed at pressure of about 900 psi for 10 minutes to form a rigid 3-dimensional fixed abrasive lap plate blank. The rigid plate blank was mounted on an 8-inch steel base plate with the aid of epoxy adhesive and subsequently planarized to a flat surface to make it ready for performance testing.

Example 8

The 3-dimensional plate blank was prepared the same way as Example 7, except that Vicron 45-3 ground calcium carbonate was replaced with 150 grams of Extendosphere SG, hollow glass spheres from Sphere one, Chattanooga, Tenn.

Example 9

Diamond beads were prepared by mixing 630 grams of Remasol SP30 colloidal silica slurry (Remasol SP30 is a 30 wt. %, 8 nm colloidal silica in water, commercially available from Remet Corporation, Utica, N.Y.) with 6.0 grams of sucrose, 103.6 grams of 0.25 μm monocrystalline diamond and diluted with 260.4 grams of de-ionized water in a 2-liter glass beaker with a propeller mixer for 20 minutes to form a diamond slurry. The slurry was dispersed further for 60 minutes with an ultrasonic disperser. The resultant slurry was spray dried with a Yamato ADL311 spray dryer (Yamato Scientific America Inc., Santa Clara, Calif.) equipped with #4 nozzle assembly having 1530 μm orifice. The slurry was under constant agitation before feeding into the inlet tube and flows into the spray chamber at inlet temperature of 170° C. Water is stripped from the slurry droplets to form discrete particles containing diamond in silica matrix and sucrose. The discrete particles are separated by the cyclone into the collection jar while steam is exhausted. Oversized particles and aggregates collected at the bottom of the drying chamber are discarded as waste. The outlet temperature is about 96° C. The diamond slurry according to this recipe provided a yield of 81 wt. % of diamond beads. Analysis of the beads by scanning electron microscopy (SEM) shows spherical particles with distinct features of porosity. The beads have a mean particle size of 18 μm as measured with Multisizer 3 Coulter Counter from Beckman Coulter Inc. Collected diamond beads were subsequently graded to a mean particle size of 23 μm.

Example 10

Diamond beads were prepared by spray drying as described in Example 9, except that 0.4 μm monocrystalline diamond powder was used instead of 0.25 μm monocrystalline diamond.

Example 11

Diamond bead powders were prepared by spray drying as described in Example 9, except that 3 μm monocrystalline diamond powder was used instead of 0.25 μm monocrystalline diamond.

Examples 12-14

3-dimensional fixed diamond abrasive plate blanks were prepared by thoroughly mixing the graded diamond beads of Examples 9-11 and Varcum 29317 phenolic resin (from SBHPP, Novi, Mich.), Vicron 45-3 ground calcium carbonate from Specialty Minerals Inc., Adams, Mass., and hollow glass sphere according to the component ratios listed in Table 3. The powder components were thoroughly mixed in a rotary mixer and poured into 8-inch round hot press mold. The powder mix was leveled, and the flange replaced to make a tight fit. The mold and content were put onto a preheated 30 ton Wabash 15"×15" molding hot press (Wabash MPI, Wabash, Ind.). The mold was heated to 300° F. and hot pressed at pressure of about 900 psi for 10 minutes to form a rigid 3-dimensional fixed abrasive lap plate blank. The rigid blank plate was mounted on an 8-inch steel base plate with the aid of epoxy adhesive and subsequently planarized to a flat surface to make it ready for performance testing.

TABLE 3

| Material description | Example 12 (wt. %) | Example 13 (wt. %) | Example 14 (wt. %) |
| --- | --- | --- | --- |
| Phenolic resin | 20 | 18 | 20 |
| 160 μm glass hollow sphere | 10 | 22 | 11 |
| Calcium carbonate | 22 | 10 | 23 |
| 0.25 μm diamond bead in silica binder | 48 | | |
| 0.40 μm diamond bead in silica binder | | 50 | |
| 3 μm diamond bead in silica binder | | | 46 |

Figure 8:
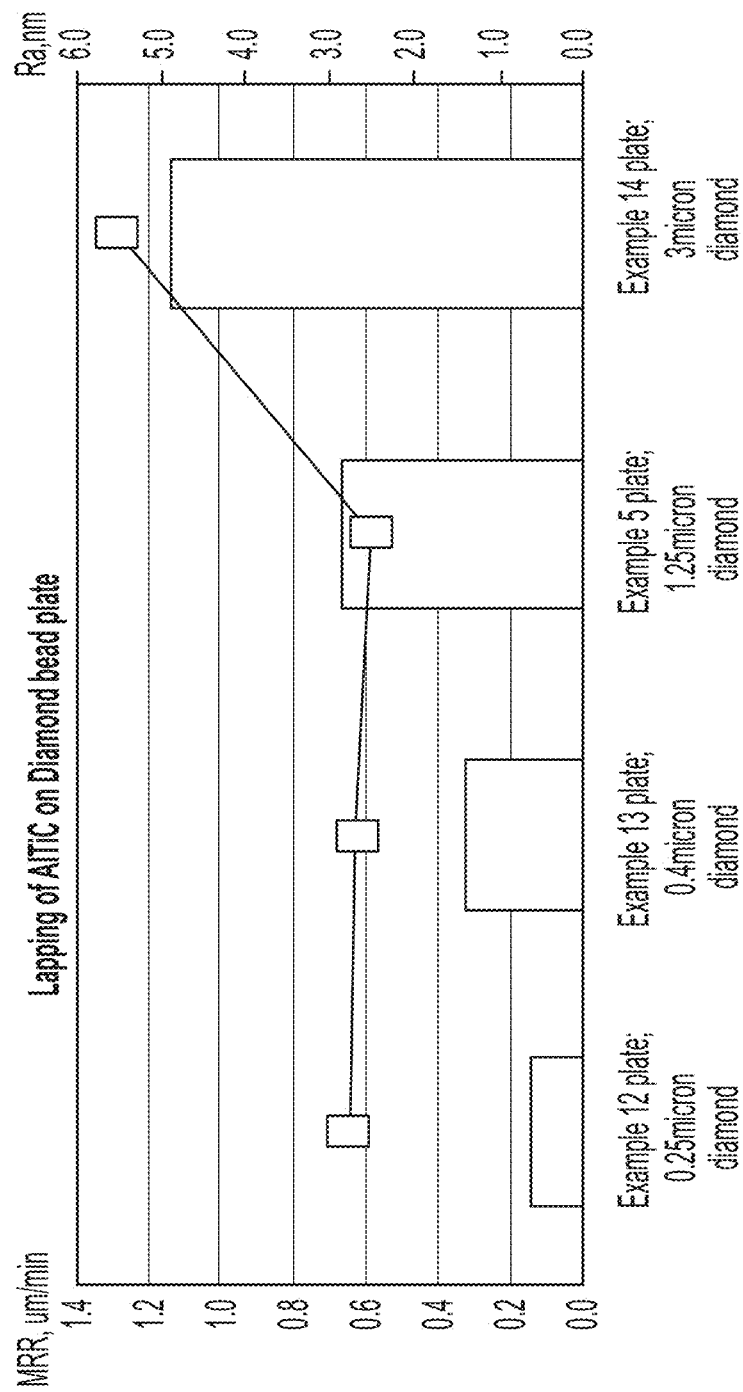
FIG. 8 illustrates the effect of diamond size on lapping of AlTiC with fixed abrasive bead plates according to an embodiment of the disclosure.

As shown in FIG. 8, the smaller diamond particle sizes provide lower material removal rate and the material removal rate increases with an increase in the diamond particle size. However, increasing the diamond particle size, such as up to 3 microns, increases the surface roughness of AlTiC samples that were lapped by the diamond abrasive plate.

Example 15

Diamond beads were prepared by mixing 926.6 grams of Nyacol TiSol A, colloidal titanium dioxide of 14 wt. % solids, (commercially available from NYACOL Nano Technologies, Inc., Ashland, Mass.) was mixed with 3.3 grams of sucrose, and 70 grams of 0.25 μm monocrystalline diamond in a 2-liter glass beaker with a propeller mixer for 20 minutes to form a diamond slurry. The slurry was dispersed further for 60 minutes with an ultrasonic disperser. The resultant slurry was spray dried with a Yamato ADL311 spray dryer (Yamato Scientific America Inc., Santa Clara, Calif.) equipped with #3 nozzle assembly having a 711 μm orifice. The slurry was under constant agitation before feeding into the inlet tube and flows into the spray chamber at inlet temperature of 170° C. Water is stripped from the slurry droplets to form discrete particles containing diamond in a titania matrix and sucrose. The discrete particles are separated by the cyclone into the collection jar while steam is exhausted. Oversized particles and aggregates collected at the bottom of the drying chamber are discarded as waste. The outlet temperature is about 84° C. The diamond slurry according to this recipe provided a yield of 78 wt. % diamond beads. Analysis of the beads by scanning electron microscopy (SEM) shows spherical particles with distinct features of porosity. The beads have a mean particle size of 14 μm as measured with a Multisizer 3 Coulter Counter from Beckman Coulter Inc.

Example 16

250 grams of graded diamond beads of about 15 μm mean diameter from Example 15, was mixed with 100 grams of Varcum 29317, phenolic resin (from SBHPP, Novi, Mich.), and 100 grams of Vicron 45-3 ground calcium carbonate from Specialty Minerals Inc., Adams, Mass., and 50 grams of glass hollow spheres of about 160 μm average diameter, to form a diamond powder mixture. The mixed powder was sieved into an 8-inch square hot press mold. The powder mix was leveled, and the flange replaced to make a tight fit. The mold and content were put onto a preheated 30 ton Wabash 15"×15" molding hot press (Wabash MPI, Wabash, Ind.). The mold was heated to 300° F. and hot pressed at pressure of about 900 psi for 10 minutes to form a rigid 3-dimensional fixed abrasive lap plate blank. The rigid blank plate was mounted on an 8-inch steel base plate with the aid of epoxy adhesive and subsequently planarized to a flat surface to make it ready for performance testing.

Example 17

The 3-dimensional fixed abrasive plate blank was prepared the same way as Example 16, except that 50 grams of glass hollow spheres of about 160 μm average diameter was replaced by 50 grams of glass hollow spheres of 11 μm average diameter.

Figure 9:
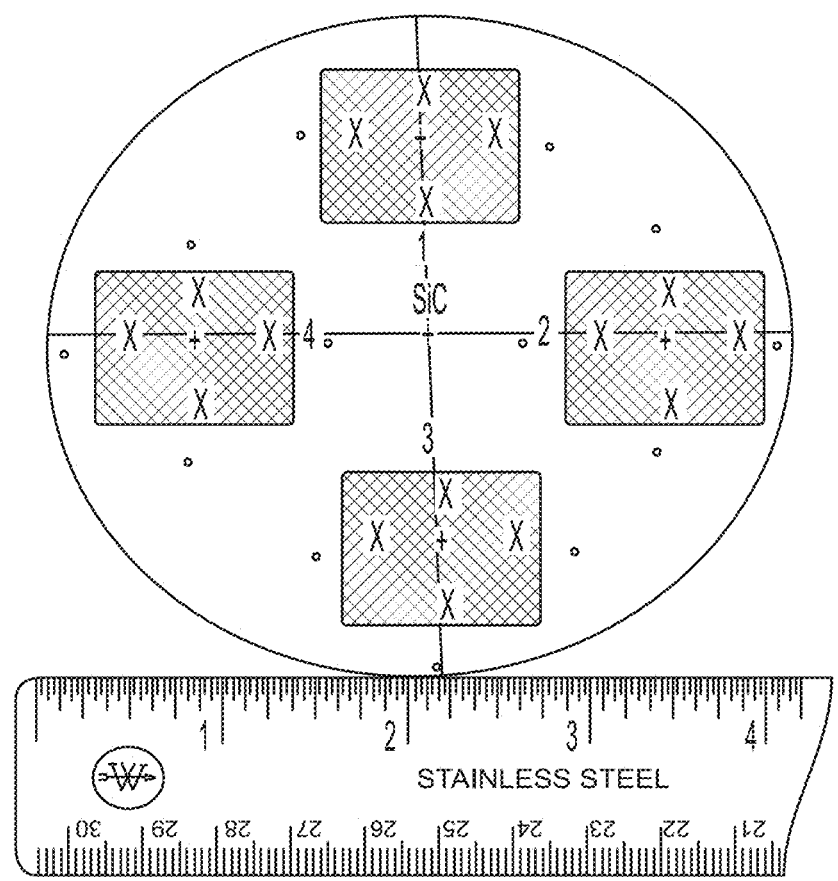
FIG. 9 shows a silicon carbide workpiece according to an embodiment of the disclosure.

The planarized plate was used to lap a silicon carbide workpiece shown in FIG. 9. The workpiece consists of 4-pieces of 1 square inch silicon carbide wafers bonded to a 4-inch diameter ceramic block. The fixed abrasive plate was mounted atop of a 15-inch platen in the center and held in place in three places with studs. The workpiece was brought into contact with the fixed abrasive plate at a pressure of 5.2 psi. The diamond bead plate rotates counterclockwise at 90 rpm, while the workpiece which is off center from the plate by 2 inches rotates counterclockwise also at about 30 rpm. Lapping of the workpiece was done in three successive runs of 10 minutes each, at a constant flow rate of 2.4 ml/min of 20 wt. % L6037 lubricant (glycol lubricant from Engis Corporation, Wheeling, Ill.) in deionized water. After each run, the difference in thickness of each silicon carbide workpiece was measured with a Fowler Sylvac Ultra-Digit Mark IV drop indicator with an accuracy of ±2 μm in to determine the average material removal rate (MRR). Surface roughness was measured using Zygo NewView 6K Optical Profilometer.

Figure 10:
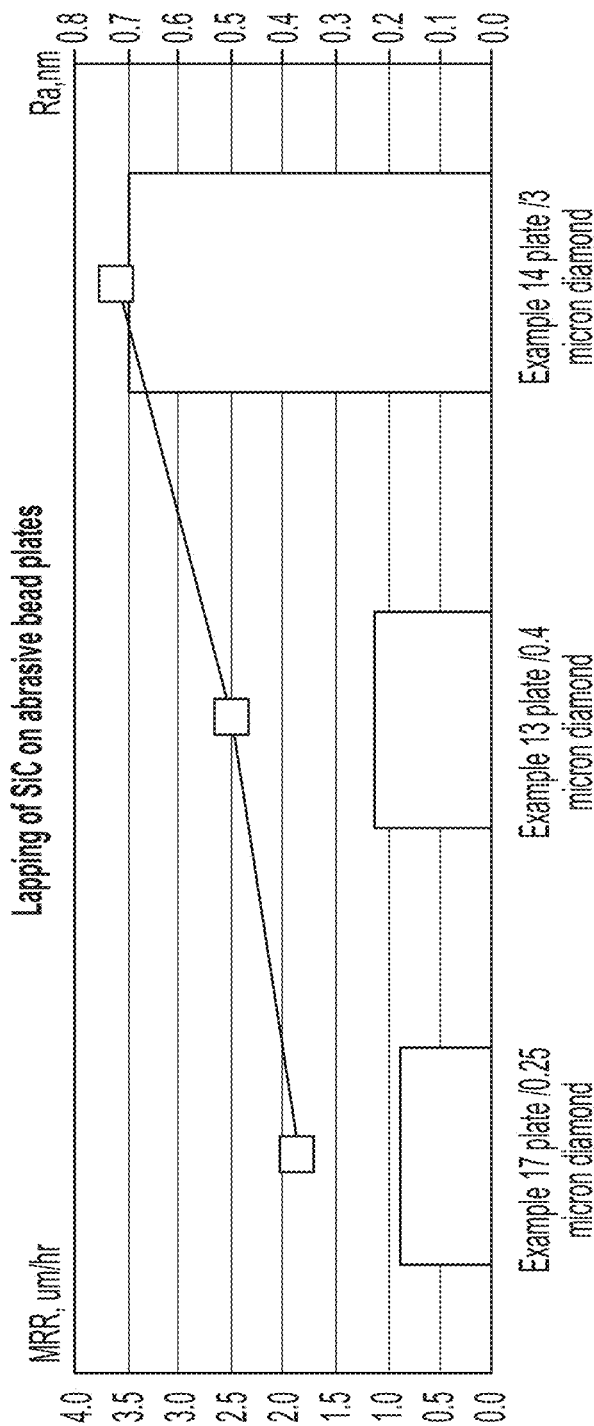
FIG. 10 illustrates the effectiveness of diamond beads in polishing of SiC wafer according to embodiments of the disclosure.

As shown in FIG. 10, the smaller diamond particle sizes provide lower material removal rate and the material removal rate increases with an increase in the diamond particle size. However, increasing the diamond particle size increases the surface roughness of SiC samples that were lapped by the diamond abrasive plate.

Example 18

A silica slurry was prepared by mixing 300 grams of Nalco 1060, colloidal silica of 50 wt. % solids, (commercially available from Nalco, Naperville, Ill.) with 3 grams of sucrose, and 5 grams of glycerin in a 1-liter glass beaker with a magnetic stirrer for 20 minutes. The slurry mixture was diluted with 192 grams of de-ionized water to form a slurry of 30.6 weight percent solids. The silica slurry was spray dried with a Yamato ADL311 spray dryer (Yamato Scientific America Inc., Santa Clara, Calif.) equipped with #4 nozzle assembly having 1530 μm orifice. The slurry was under constant agitation before feeding into the inlet tube and flows into the spray chamber at inlet temperature of 170° C. Water is stripped from the slurry droplets to form discrete spherical beads of silica. The discrete particles are separated by the cyclone into the collection jar while steam is exhausted. Oversized particles and aggregates collected at the bottom of the drying chamber are discarded as waste. The outlet temperature is about 84° C. The diamond slurry according to this recipe provided a yield of 96 wt. % silica beads. Analysis of the beads by scanning electron microscopy (SEM) shows spherical particles with distinct features of porosity. The beads have a mean particle size of 17 μm as measured with a Multisizer 3 Coulter Counter from Beckman Coulter Inc.

150 grams of silica beads of about 17 μm mean diameter was mixed with 70 grams of 3 monocrystalline diamond grains (from Engis Corporation, Wheeling, Ill.) and 110 grams of Varcum 29317 phenolic resin (from SBHPP, Novi, Mich.), and 120 grams of Vicron 45-3 ground calcium carbonate from Specialty Minerals Inc., Adams, Mass., and 50 grams of glass hollow spheres of about 160 μm average diameter, to form a diamond powder mixture. The mixed powder was sieved into an 8-inch square hot press mold. The powder mix was leveled, and the flange replaced to make a tight fit. The mold and content were put onto a preheated 30-ton Wabash 15"×15" molding hot press (Wabash MPI, Wabash, Ind.). The mold was heated to 300° F. and hot pressed at pressure of about 900 psi for 10 minutes to form a rigid 3-dimensional fixed abrasive lap plate blank. The rigid blank plate was mounted on an 8-inch steel base plate with the aid of epoxy adhesive and subsequently planarized to a flat surface.

The planarized plate was used to lap a silicon carbide workpiece shown in FIG. 9 of example 17. Surface roughness was measured using Zygo NewView 6K Optical Profilometer. The material removal rate (MRR) for this plate is 10 μm/hr and the surface roughness (Ra) is 1.6 nm.

Example 19

Alumina slurry was prepared by mixing 500 grams of Wesol D30, colloidal alumina sol of 30 wt. % solids, and about 100 nm mean particle size (from Wesbond Corp., Wilmington, Del.) with 65 grams of Aerodisp W740 colloidal titanium dioxide of 40% solid concentration and about 70 nm mean particle size, (Evonik Corp., Parsippany, N.J.), in a 1-liter glass beaker with a magnetic stirrer for 20 minutes. The mixed slurry has 31.2 weight percent solids. The alumina slurry was spray dried with Yamato ADL311 spray dryer (Yamato Scientific America Inc., Santa Clara, Calif.) equipped with a #4 nozzle assembly having 1530 μm orifice. The slurry was under constant agitation before feeding into the inlet tube and flows into the spray chamber at inlet temperature of 170° C. Water is stripped from the slurry droplets to form discrete spherical beads of alumina. The discrete particles are separated by the cyclone into the collection jar while steam is exhausted. Oversized particles and aggregates collected at the bottom of the drying chamber are discarded as waste. The outlet temperature is about 89° C. Alumina slurry according to this recipe provided a yield of 76 wt. % alumina beads. The alumina beads were sintered at 1100° C. at atmospheric conditions to convert the boehmite alumina into alpha phase alumina. Analysis of the beads by scanning electron microscopy (SEM) shows spherical particles with distinct features of porosity. The beads have a mean particle size of 11 μm as measured with Multisizer 3 Coulter Counter from Beckman Coulter Inc.

The alumina beads were mixed with 7 micron monocrystalline diamond and made into rigid 3-dimensional fixed abrasive lapping plate according to present disclosure. The plate was used to lap AlTiC workpiece at 5.2 psi to provide an average material removal rate of 1.1 μm/min and surface roughness measured as Ra of 11.2 nm.

Fixed abrasive three-dimensional rigid plates according to embodiments of the disclosure provide increased material removal rates during lapping and polishing operations compared to other abrasive plates. Furthermore, the abrasive plates according to embodiments of the disclosure provide a smoother surface roughness of the lapped or polished article than other abrasive plates.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

It will be understood that not all advantages have been necessarily discussed herein, no particular advantage is required for all embodiments or examples, and other embodiments or examples may offer different advantages.

What is claimed is:

1. A fixed abrasive three-dimensional rigid plate suitable for use in precision lapping and polishing of advanced materials, said fixed abrasive three-dimensional rigid plate is composed of a composition comprising:
   a) a plurality of micron-sized composite spherical abrasive beads;
   b) at least one polymeric resin bonding the spherical abrasive beads;
   c) 1 wt. % to 40 wt. % on a dry weight basis of the rigid plate of at least one porosity additive; and
   d) 1 wt. % to 40 wt. % on a dry weight basis of the rigid plate of one or more inorganic fillers,
   wherein said fixed abrasive three-dimensional rigid plate has a surface area porosity of 5% to 60%, and
   a plurality of the pores in the rigid plate is neither uniform nor regular and are not intra-connected throughout a thickness of the three-dimensional abrasive plate.

2. The fixed abrasive three-dimensional rigid plate of claim 1, wherein the abrasive beads are formed from spray drying a sprayable slurry of abrasive particles, inorganic metal oxide binder, and dispersants.

3. The fixed abrasive three-dimensional rigid plate of claim 2, wherein the abrasive particles are chosen from natural diamond, synthetic diamond, cubic boron nitride, silicon carbide, and combinations thereof.

4. The fixed abrasive three-dimensional rigid plate of claim 2, wherein the abrasive particles are natural or synthetic diamond.

5. The fixed abrasive three-dimensional rigid plate of claim 4, wherein the abrasive beads have an average particle size of 5 microns to 50 microns.

6. The fixed abrasive three-dimensional rigid plate of claim 5, wherein the abrasive particles contained in the abrasive beads have an average particle size of 0.01 microns to 10 microns.

7. The fixed abrasive three-dimensional rigid plate of claim 4, wherein the abrasive beads comprise 30% to 95% of the composition of the rigid plate by weight, and the diamond particles comprise from 20% to 50% by weight of the abrasive beads on a dry basis.

8. The fixed abrasive three-dimensional rigid plate of claim 2, wherein the inorganic metal oxide binder is chosen from silicon dioxide, titanium dioxide, cerium oxide, zirconium oxide, aluminum oxide, and mixtures thereof.

9. The fixed abrasive three-dimensional rigid plate of claim 1, wherein the polymeric resin is chosen from the group consisting of base-catalyzed phenolic resin, acid-catalyzed phenolic resin, epoxy resins, unsaturated polyester resins, and mixtures thereof.

10. The fixed abrasive three-dimensional rigid plate of claim 9, wherein the polymeric resin is a base-catalyzed phenolic resin.

11. The fixed abrasive three-dimensional rigid plate of claim 10, wherein the composition of the rigid plate comprises from 5 wt. % to 35 wt. % of the polymeric resin.

12. The fixed abrasive three-dimensional rigid plate of claim 1, wherein the porosity additive are hollow glass spheres having an average diameter of 10 microns to 200 microns.

13. The fixed abrasive three-dimensional rigid plate of claim 1, wherein the filler is selected from the group consisting of calcium carbonate, calcium metasilicate, talc, kaolin, calcium oxide, and mixtures thereof.

14. The fixed abrasive three-dimensional rigid plate of claim 1, wherein the filler is calcium carbonate.

15. A fixed abrasive three-dimensional rigid plate suitable for use in precision lapping and polishing of advanced materials, the fixed abrasive three-dimensional rigid plate is composed of a composition comprising:
   a) a plurality of micron-sized inorganic metal oxide spherical beads;
   b) super abrasive particles;
   c) at least one polymeric resin bonding the spherical metal oxide beads and super abrasive particles together;
   d) 1 wt. % to 40 wt. % of at least one porosity additive based on a weight of the composition; and
   e) 1 wt. % to 40 wt. % of one or more inorganic fillers based on a dry weight basis of the composition,
   wherein said fixed abrasive three-dimensional rigid plate has a surface area porosity of 5% to 60%, and a plurality of the pores in the rigid plate is neither uniform nor regular and are not intra-connected throughout a thickness of the three-dimensional abrasive plate.

16. The fixed abrasive three-dimensional rigid plate of claim 15, wherein the inorganic metal oxide spherical beads are formed from spray drying a metal oxide binder and dispersants.

17. The fixed abrasive three-dimensional rigid plate of claim 15, wherein the inorganic metal oxide binder is chosen from silicon dioxide, titanium dioxide, cerium oxide, aluminum oxide, and mixtures thereof.

18. The fixed abrasive three-dimensional rigid plate of claim 15, wherein the super abrasive particles are chosen from natural diamond, synthetic diamond, cubic boron nitride, and silicon carbide.

19. A method of forming a fixed abrasive three-dimensional rigid plate suitable for use in precision lapping and polishing of advanced materials, said fixed abrasive three-dimensional rigid plate being composed of a composition comprising:
   a) a plurality of micron-sized composite abrasive spherical beads or a mixture of micron-sized metal oxide beads and super abrasive particles;
   b) at least one polymeric resin bonding the spherical beads or metal oxide beads together;
   c) 1 wt. % to 40 wt. % based on a weight of the composition of at least one porosity additive; and
   d) 1 wt. % to 40 wt. % on a dry weight basis of the composition of one or more inorganic fillers,
   wherein the three-dimensional fixed abrasive rigid plate is formed to provide a three-dimensional rigid plate with a controlled surface area porosity of 5 to 60% by steps of:
   hot pressing, heat assisted hardening, or room temperature hardening of the composition;
   bonding the hot pressed composition to a base plate; and
   grinding the bonded hot pressed composition to a flatness,
   wherein said three-dimensional fixed abrasive rigid plate is capable of lapping an AlTiC workpiece to reduce the surface roughness Ra from 30 nm to 3 nm or less in less than 15 minutes, and
   said three-dimensional fixed abrasive bead plate is capable of polishing a SiC workpiece to a surface roughness Ra of 0.4 nm or less in about 60 minutes.

20. The method of claim 19, wherein the hot pressing includes forming the fixed abrasive three-dimensional rigid plate in a mold at a molding temperature from 240° F. to 380° F.

21. The method of claim 20, wherein the hot pressing is at a pressure of 500 psi to 2,000 psi.

22. The method of claim 20, wherein the hot pressing is at a pressure of 800 psi to 1,200 psi.

23. The method of claim 20, wherein the hot pressing is at a pressure of 800 psi to 1,200 psi, and the plate has a thickness of 0.1 inch to 1.0 inch.

24. The method of claim 20, wherein the hot pressing is at a pressure of 800 psi to 1,200 psi, and the plate has a diameter of 1 inch to 60 inches.

25. The method of claim 20, wherein the fixed abrasive three-dimensional rigid plate includes a plurality of pores.

26. The method of claim 25, wherein the pores are non-uniform, non-regular and are not intra-connected throughout the thickness of said abrasive three-dimensional rigid plate.

* * * * *